US012563159B2

(12) United States Patent
Choi

(10) Patent No.: US 12,563,159 B2
(45) Date of Patent: Feb. 24, 2026

(54) METHOD FOR PROVIDING SPEECH BUBBLE IN VIDEO CONFERENCE AND SYSTEM THEREOF

(71) Applicant: SAMSUNG SDS CO., LTD., Seoul (KR)

(72) Inventor: Ji Seon Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 239 days.

(21) Appl. No.: 18/384,219

(22) Filed: Oct. 26, 2023

(65) Prior Publication Data

US 2024/0146878 A1 May 2, 2024

(30) Foreign Application Priority Data

Oct. 27, 2022 (KR) ........................ 10-2022-0140453

(51) Int. Cl.
*H04N 7/15* (2006.01)
*G10L 15/18* (2013.01)
*G10L 15/26* (2006.01)

(52) U.S. Cl.
CPC ............. *H04N 7/152* (2013.01); *G10L 15/18* (2013.01); *G10L 15/26* (2013.01); *H04N 7/155* (2013.01)

(58) Field of Classification Search
CPC ........ H04N 7/152; H04N 7/155; G10L 15/18; G10L 15/26
USPC ...................................................... 348/14.09
See application file for complete search history.

(56) References Cited

U.S. PATENT DOCUMENTS

| | | | | |
|---|---|---|---|---|
| 10,074,381 | B1 * | 9/2018 | Cowburn | ................ G06T 11/00 |
| 11,082,465 | B1 * | 8/2021 | Chavez | ................. G06V 40/20 |
| 2015/0312182 | A1 * | 10/2015 | Langholz | ............ G06F 3/04842 |
| | | | | 715/753 |
| 2018/0143802 | A1 * | 5/2018 | Jang | ........................ G10L 15/30 |
| 2018/0330732 | A1 * | 11/2018 | Dasgupta | .............. G06F 3/0484 |
| 2019/0130629 | A1 * | 5/2019 | Chand | .................. G06V 40/172 |
| 2021/0011684 | A1 * | 1/2021 | Trim | ....................... G06F 9/451 |
| 2021/0304107 | A1 * | 9/2021 | Fink | ................. G06Q 10/06398 |
| 2021/0339134 | A1 * | 11/2021 | Knoppert | ................ A63F 13/26 |
| 2021/0407158 | A1 * | 12/2021 | Sen | ......................... G10L 15/26 |
| 2022/0159047 | A1 | 5/2022 | Mahajan et al. | |

(Continued)

FOREIGN PATENT DOCUMENTS

| | | |
|---|---|---|
| CN | 107911646 A | 4/2018 |
| JP | 2022-112784 A | 8/2022 |

(Continued)

*Primary Examiner* — Binh Kien Tieu
(74) *Attorney, Agent, or Firm* — Sughrue Mion, PLLC

(57) ABSTRACT

Provided is a method for providing a speech bubble in a video conference. The method is performed by a user terminal and includes: receiving a first speech text converted from a voice signal of a first conference participant participating in a video conference into text; determining whether to activate a cartoon mode; displaying, based on determining to activate the cartoon mode, a conference screen including a first participant object and a first speech bubble, wherein the first participant object indicates the first conference participant and the first speech bubble is generated using the first speech text; and displaying, in response to a user input to select the first speech bubble, a sequence of speech texts of the video conference, the sequence including a speech text corresponding to the first speech bubble.

18 Claims, 19 Drawing Sheets

(56)     References Cited

U.S. PATENT DOCUMENTS

| | | | |
|---|---|---|---|
| 2022/0254336 A1* | 8/2022 | Lorphelin | G06V 40/20 |
| 2022/0414349 A1* | 12/2022 | Rathnam | G06F 40/58 |
| 2023/0300533 A1* | 9/2023 | Kim | H04R 5/04 |
| | | | 700/94 |
| 2023/0377607 A1* | 11/2023 | Bonnie | G10L 13/0335 |
| 2024/0146878 A1* | 5/2024 | Choi | G10L 15/26 |

FOREIGN PATENT DOCUMENTS

| | | | |
|---|---|---|---|
| KR | 10-2007-0039669 A | 4/2007 |
| KR | 10-0868638 B1 | 11/2008 |
| KR | 10-1278049 B1 | 6/2013 |
| KR | 10-2177691 B1 | 11/2020 |
| KR | 10-2022-0009319 A | 1/2022 |

* cited by examiner

S200c

S210c compare predetermined participation index threshold value of video conference and participation index of participant of currently ongoing video conference S220c if participation index of participant of video conference exceed threshold value, cartoon mode is activated

1

METHOD FOR PROVIDING SPEECH BUBBLE IN VIDEO CONFERENCE AND SYSTEM THEREOF

This application claims priority from Korean Patent Application No. 10-2022-0140453, filed on Oct. 27, 2022, in the Korean Intellectual Property Office, the disclosure of which is incorporated herein by reference in its entirety.

BACKGROUND

1. Field

This disclosure relates to a method and system for providing a speech bubble function during a video conference.

2. Description of the Related Art

As the social paradigm changes to the untact era in a global disaster situation such as Corona, the frequency of video meetings (video conferences) is increasing in companies and public institutions, and the number of users of video conferencing programs is rapidly increasing.

If a plurality of participants speak at the same time during a video conference, the speech may overlap, causing the sound to be cut off or overlapping, and the order of speech cannot be determined, making it impossible to properly communicate with each other. Therefore, there is a problem in that the video conference cannot proceed properly resulting from the above.

For example, when real people are having a conversation, two-way communication is possible without delay, but in the case of a video conference, a slight delay occurs, so the more voice signals sent simultaneously, the less likely they are to be transmitted, communication efficiency decreases, and two-way communication becomes difficulty due to overlapping.

Therefore, a method is required to more easily understand the flow of conversation during a video conference and to accurately understand the content of the conversation even when the conversation overlaps or the sound is interrupted.

PRIOR ART

Korean Patent Application Publication No. 10-2007-0039669 (published on Apr. 13, 2007)

SUMMARY

The technical problem to be solved by the present disclosure is to provide a method and system for displaying voice conversations of video conference participants on a screen as speech bubbles.

Another technical problem to be solved by the present disclosure is to provide a method and system that can automatically activate the speech bubble function by determining whether the function of displaying voice conversations of video conference participants on the screen as speech bubbles is activated.

Another technical problem to be solved by the present disclosure is to provide a method and system for providing a graphic user interface (GUI) that displays the sequence of each speech text in a video conference.

The technical problems of the present disclosure are not limited to the technical problems mentioned above, and other technical problems not mentioned can be clearly understood by those skilled in the art from the description below.

According to an aspect of the inventive concept, there may be provided a method being performed by a user terminal and including: receiving a first speech text converted from a voice signal of a first conference participant participating in a video conference into text; determining whether to activate a cartoon mode; displaying, based on determining to activate the cartoon mode, a conference screen including a first participant object and a first speech bubble, wherein the first participant object indicates the first conference participant and the first speech bubble is generated using the first speech text; and displaying, in response to a user input to select the first speech bubble, a sequence of speech texts of the video conference, the sequence including a speech text corresponding to the first speech bubble.

The method may further include: arranging and displaying, based on a user input to select a first function of a graphical user interface (GUI) that displays the sequence of the speech texts of the video conference, the speech texts in an order of a participation rate of participants of the video conference.

The determining whether to activate the cartoon mode may include determining a similarity between participants of the video conference and participants of a past video conference, and determining to activate the cartoon mode based on the similarity exceeding a threshold value.

The determining whether to activate the cartoon mode may include extracting a keyword from the first speech text using a natural language processing algorithm; and determining, based on a similarity between the keyword and a predetermined keyword exceeding a threshold value, to activate the cartoon mode.

The determining whether to activate the cartoon mode may include comparing a predetermined participation index threshold value with a participation index of participants of the video conference, and determining to activate the cartoon mode based on the participation index of the participants of the video conference exceeding the predetermined participation index threshold value.

The determining whether to activate the cartoon mode may include determining, based on a network environment index of the video conference exceeding a predetermined threshold value of a network environment index, to activate the cartoon mode.

The displaying the conference screen may include displaying the first speech bubble having a predetermined transparency; gradually increasing the transparency of the first speech bubble over time; and terminating the first speech bubble based on the transparency reaching a predetermined value.

The displaying the conference screen may further include detecting whether the first speech text includes a text in a question format; maintaining the transparency of the first speech bubble based on detecting that the first speech text includes the text in the question format; and terminating the first speech bubble based on detecting a response from a participant of the video conference to the text in the question format.

The displaying the conference screen may include determining a level of attention of participants of the video conference with respect to the first speech bubble, and displaying the first speech bubble by reflecting the level of attention.

The displaying the first speech bubble by reflecting the level of attention may include determining a number of times the participants of the video conference select the first speech bubble; and displaying the number of times the first speech bubble is selected.

The method may further include selecting, by a user of the user terminal, a whispering target that includes at least one of participants of the video conference; and performing a whisper function between the user and the whispering target.

According to an aspect of the inventive concept, there may be provided a method being performed by a user terminal and including: receiving a first speech text converted from a voice signal of a first conference participant participating in a video conference into text; determining whether to activate a cartoon mode; and displaying, based on determining to activate the cartoon mode, a conference screen including a first participant object and a first speech bubble, wherein the first participant object indicates the first conference participant and the first speech bubble is generated using the first speech text, wherein the first speech bubble is rendered to visually express predetermined information related to the first conference participant.

The determining to activate the cartoon mode may include determining a similarity between participants of the video conference and participants of a past video conference, and determining to activate the cartoon mode based on the similarity exceeding a threshold value.

The determining to activate the cartoon mode may include extracting a keyword from the first speech text using a natural language processing algorithm; and determining, based on a similarity between the keyword and a predetermined keyword exceeding a threshold value, to activate the cartoon mode.

The predetermined information may be information indicating a level of attention of participants of the video conference with respect to the first speech bubble.

The level of attention of the participants of the video conference may be a value determined based on a number of times the participants of the video conference select the first speech bubble.

The predetermined information may be information indicating a participation level of the first conference participant, wherein the participation level is a value determined based on a number of speeches of the first conference participant.

According to an aspect of the inventive concept, there may be provided a method being performed by a user terminal and including: receiving a first speech text converted from a voice signal of a first conference participant participating in a video conference into text; determining whether to activate a cartoon mode; displaying, based on determining to activate the cartoon mode, a conference screen including a first participant object and a first speech bubble, wherein the first participant object indicates the first conference participant and the first speech bubble is generated using the first speech text; and in response to a speech bubble removal signal received according to an occurrence of an event for removing the first speech bubble, removing the first speech bubble from the conference screen.

The first speech text may include a text in a question format, and the event for removing the first speech bubble is an event, in which a response of a participant of the video conference to the text in the question format is detected.

The determining to activate the cartoon mode may include determining a similarity between participants of the video conference and participants of a past video conference, and determining to activate the cartoon mode based on the similarity exceeding a threshold value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
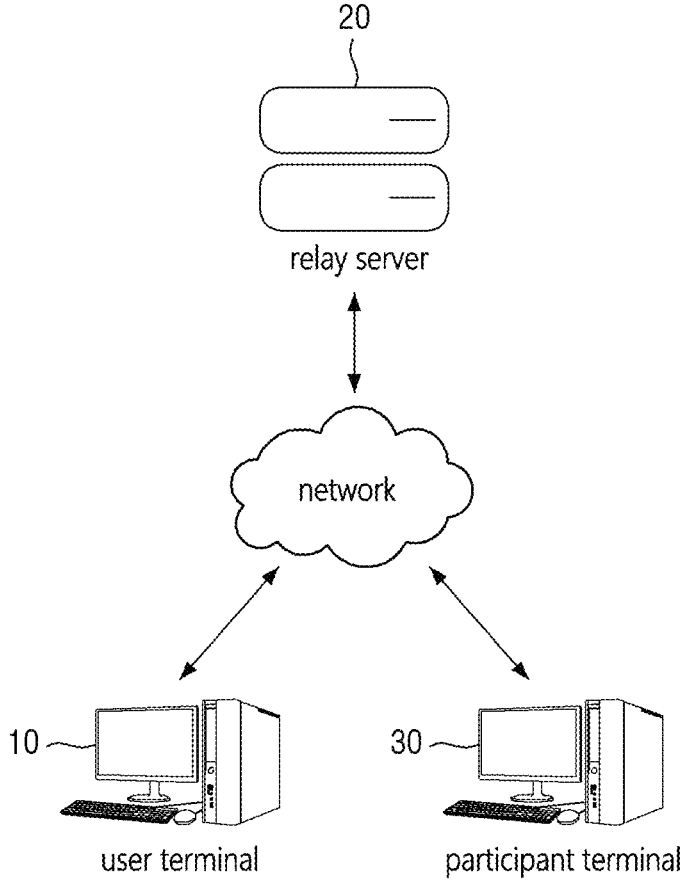
FIG. 1 is a configuration diagram of a video conference speech bubble provision system according to an embodiment of the present disclosure.

Hereinafter, preferred embodiments of the present disclosure will be described in detail with reference to the accompanying drawings. Advantages and features of the present invention, and methods of achieving them will become clear with reference to the detailed description of the following embodiments taken in conjunction with the accompanying drawings. However, the technical idea of the present invention is not limited to the following embodiments and can be implemented in various different forms. Only the following embodiments are provided to complete the technical idea of the present invention, and fully inform those skilled in the art of the technical field to which the present invention belongs the scope of the present invention, and the technical spirit of the present invention is only defined by the scope of the claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings:

In the following embodiments, content may mean data in text format used to enable a chatbot to perform a question and answer with a user. The content may include, for example, a title area and a body area. In the technical field, content may be used interchangeably with terms such as chatbot content and chatbot data. Alternatively, content may refer to data in text form of a file stored in a cloud storage. For example, content may include the title of the file or the body of the file. In addition, any format that can express the text of the content, such as a web document such as HTML (HyperText Markup Language) or XML (eXtensible Markup Language), is acceptable.

Hereinafter, several embodiments of the present disclosure will be described with reference to the drawings.

FIG. 1 is a configuration diagram of a video conference speech bubble provision system according to an embodiment of the present disclosure.

Referring to FIG. 1, the video conference speech bubble provision system according to this embodiment may include a user terminal 10, a relay server 20, and a participant terminal 30.

The user terminal 10 may generate a video conference and display a speech bubble generated using speech text obtained by converting voice signals of participants in the video conference into text. Here, the user of the user terminal 10 may be a participant in the video conference, and the same may be understood in other embodiments of the present disclosure below.

According to one embodiment, the user terminal 10 may convert the user's voice signal into text to generate a speech text. Here, various known STT (Speech-to-Text) algorithms can be used as a method of converting a voice signal into text.

According to one embodiment, the user's voice signal may be transmitted to the relay server 20, and the user terminal 10 may receive a speech text converted from the voice signal from the relay server 20.

According to one embodiment, the user terminal 10 may receive a speech text converted from a voice signal that is input to the video conference participant terminal 30 from the relay server 20.

According to one embodiment, the user terminal 10 may activate a cartoon mode graphic user interface (GUI). Here, the cartoon mode means that the user terminal 10 converts the voice signal of the first conference participant participating in the video conference into text and displays a first speech bubble using the converted first speech text, and the first speech bubble may be a mode (function) that displays the first speech bubble to be included in the first participant object indicating the first conference participant, and it may be understood similarly in other parts described in the present disclosure below.

According to the above-described embodiment, by activating the cartoon mode, participants in a video conference can view the content and flow of the conversation even when conversations overlap as multiple participants in the video conference talk at the same time or sound is cut off due to network problems.

According to one embodiment, the user terminal 10 can perform various methods to determine whether to activate the cartoon mode GUI (hereinafter referred to as cartoon mode) and perform various functions using speech bubbles generated after the cartoon mode is activated.

For example, the user terminal 10 may display the speech bubble history in response to a user input of the user of the user terminal 10 indicating selection of the first speech bubble. Here, the speech bubble history may refer to a GUI that displays the sequence of each speech text of the video conference in response to a user input of the user of the computing system indicating the selection of the first speech bubble, and may refer to a GUI that automatically moves the viewpoint so that the speech text corresponding to the first speech bubble is displayed, and it may hereinafter be understood similarly in other parts of the present disclosure.

Various methods for determining whether to activate the cartoon mode and various embodiments using speech bubbles will be described later in FIG. 2 and the other drawings.

The relay server 20 may receive a video conference participant's voice signal from the participant terminal 30, convert it into text, generate a speech text, and then transmit the generated speech text to the user terminal 10.

According to one embodiment, the relay server 20 may generate a video conference according to the request of the user terminal 10, and provide a speech bubble generated using speech text, in which voice signals of participants in the video conference are converted into text, and speech bubble history to the user terminal 10.

According to one embodiment, the relay server 20 can perform various methods of determining whether to activate the cartoon mode and provide them to the user terminal 10, and provide various functions using speech bubbles generated after the cartoon mode is activated to the user terminal 10.

The participant terminal 30 may be a participant terminal of a single or a plurality of participants participating in a video conference. Users of the user terminal 10 and participants of the participant terminal 30 can conduct a video conference through the relay server 20 and utilize a whisper function, etc. by utilizing the cartoon mode. Some embodiments of conducting a video conference between participants using the cartoon mode will be described later.

It should be noted that each component of the video conference speech bubble provision system shown in FIG. 1 represents functionally distinct functional elements, and that a plurality of components may be implemented in an integrated form in an actual physical environment. For example, at least some of the user terminal 10 and the relay server 20 may be implemented in the form of different logic within one physical computing device.

Additionally, in an actual physical environment, each of the above components may be implemented as separated into a plurality of detailed functional elements. For example, the first function of the relay server 20 may be implemented in a first computing device, and the second function may be implemented in a second computing device.

Also, as shown in FIG. 1, the user terminal 10, the participant terminal 30, and the relay server 20 can communicate through a network. Here, the network may be implemented as all types of wired/wireless networks such as Local Area Network (LAN), Wide Area Network (WAN), mobile radio communication network, Wibro (Wireless Broadband Internet), etc.

So far, the video conference speech bubble provision system and network environment according to an embodiment of the present disclosure have been described with reference to FIG. 1. Hereinafter, a method for providing video conference speech bubbles according to various embodiments of the present disclosure will be described in detail. In order to provide convenience of understanding, the description of the above method will be continued assuming the environment shown in FIG. 1, but those skilled in the art will clearly understand that the environment, in which the video conference speech bubble is provided, can be modified.

Each step of the methods to be described below may be performed by a computing device. In other words, each step of the above methods may be implemented as one or more instructions executed by a processor of a computing device. All steps included in the methods may be performed by a single physical computing device. Alternatively, the first steps of the method may be performed by a first computing device and the second steps of the method may be performed by a second computing device. That is, each step of the method can be performed by a computing system. Hereinafter, unless otherwise specified, the description will be continued assuming that each step of the above method is performed by the user terminal 10 or the relay server 20. However, for convenience of explanation, the description of the operation subject of each step included in the method may be omitted. In addition, in the methods to be described later, the execution order of each operation can be changed within the range where the execution order can be logically changed as needed.

Figure 2:
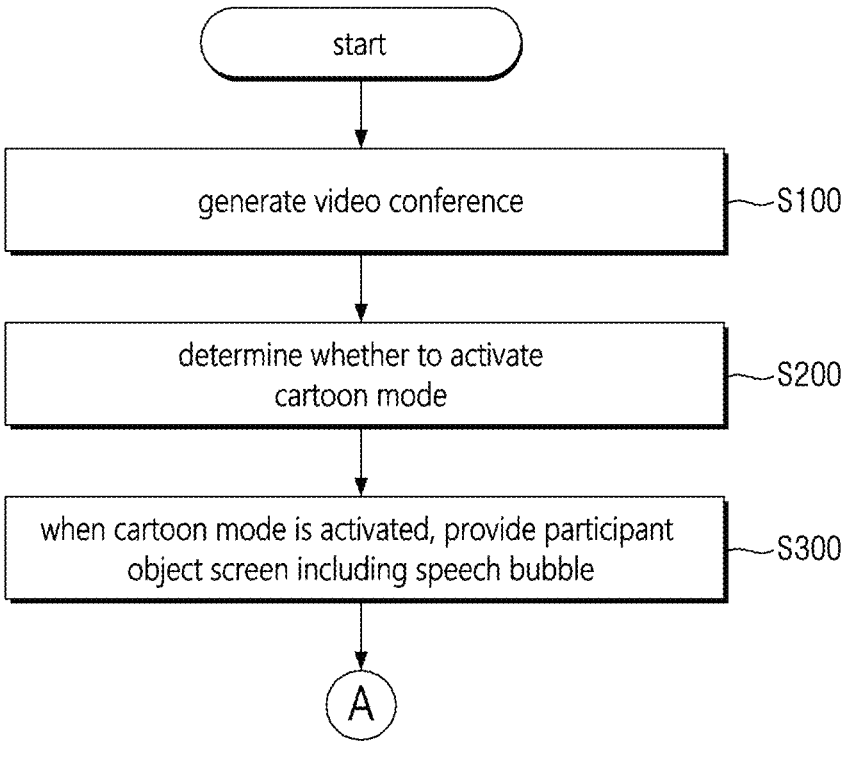
FIG. 2 is a flowchart of a method for providing a video conference speech bubble according to another embodiment of the present disclosure.

FIG. 2 is a flowchart of a method for providing a video conference speech bubble according to another embodiment of the present disclosure.

In step S100, a video conference may be generated (S100). Here, a video conference may be an online meeting between two or more participants using devices that provide video and/or audio input and output.

According to one embodiment, the video conference method may be a video conference, in which various methods are applied, such as a method, in which one person unilaterally delivers the message, a method, in which all participants participate in the conference, and a method using only audio input and output without video input.

According to one embodiment, the method of participating in a video conference may be in the form of the user of the user terminal 10 generating a video conference, and the remaining participants participating in the generated video conference. At this time, the video conference may be provided through the relay server 20.

In step S200, it may be determined whether to activate the cartoon mode. Activation of the cartoon mode may be performed automatically by the computing system, or may be performed manually by input such as a user's click or touch.

According to one embodiment, the step of determining whether to activate the cartoon mode may comprise the step of determining the similarity between participants in a video conference and participants in a past video conference, and determining to activate the cartoon mode when the similarity exceeds a threshold value.

Here, the participant information of the past video conference may be extracted by an AI data collection and processing platform that can collect and process the information of the video conference that has ended in the past into data, which is stored in the user terminal 10, the relay server 20, and the participant terminal 30. The AI data collection and processing platform may be an internal or external platform.

Here, the method of determining the similarity of participants may be a method, for example, in which the participants of the first video conference in the past with the participants of the currently ongoing video conference are compared, and if the overlapped participants exceed the threshold value, it is determined to activate the cartoon mode since the similarity exceeds the threshold value. Here, the threshold value may be a threshold value extracted using a machine learning model based on participant information of past video conferences. Here, various previously known models may be used as the machine learning model.

Hereinafter, embodiments of determining whether to activate the cartoon mode will be described with reference to FIGS. 3 to 5.

Figure 3:
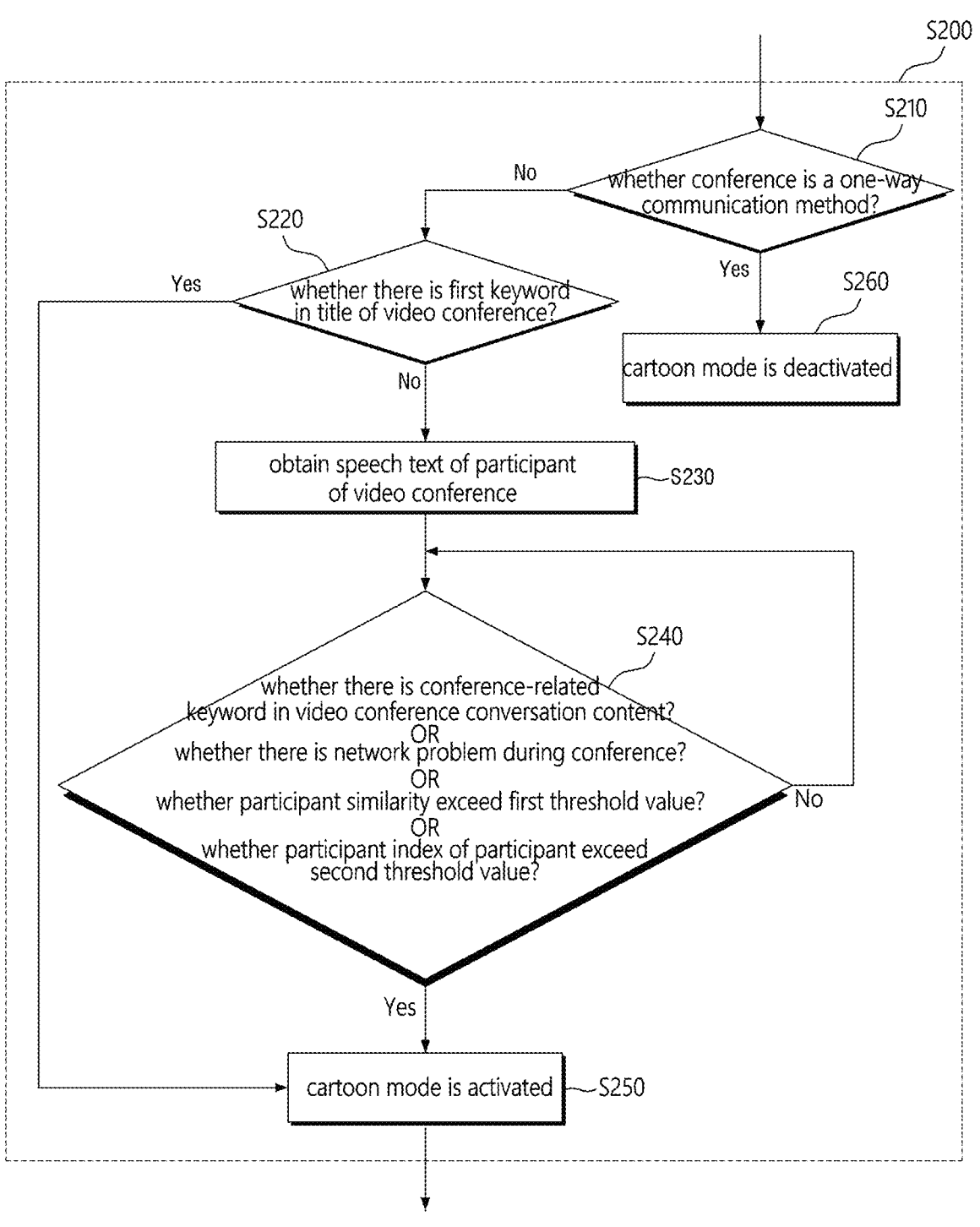
FIGS. 3 to 6 are detailed flowcharts for describing in detail the method of determining whether to activate the cartoon mode described with reference to FIG. 2.

Referring to FIG. 3, in step S210, it can be determined whether the video conference method is a one-way communication method. As a result of the above determination, if the video conference method is a one-way communication method by a single or a plurality of messengers, the cartoon mode may be deactivated (S260).

As a result of the above determination, if the video conference method is not a video conference method of a one-way communication method, it may be determined whether a keyword related to the conference exists in the video conference title (S220).

According to one embodiment, steps S210 and S220 may be performed when a video conference, in which video conference participants are scheduled, is generated. Alternatively, steps S210 and S220 may be performed based on the participants who participated in the video conference at the scheduled time.

Here, the keywords related to the conference may be keywords that have been predetermined by analyzing patterns according to the type and frequency of participants' conversations in past video conferences and extracting natural languages frequently used in conversations. The analysis and extraction can be performed by an AI data collection and processing platform.

According to one embodiment, the similarity between the keywords related to the conference and the video conference title may be calculated, and if the similarity exceeds a threshold value, it may be determined to activate the cartoon mode (S250). Here, various previously known similarity determination algorithms can be used as a similarity determination method.

Additionally, as a result of the above determination, if there are no keywords related to the conference in the title of the video conference or if the similarity does not exceed the threshold value, the video conference may proceed.

In step S230, when a participant's voice signal is input during a video conference, speech text for the participant's voice signal may be obtained using a Speech-to-Text (STT) algorithm based on the voice signal.

According to one embodiment, the speech text by each of the participants may be obtained separately for each participant, and may be obtained separately in chronological order based on the time when each participant started speaking.

According to one embodiment, the first speech text for the first voice signal by the first participant and the second speech text for the second voice signal can be separated based on the case where the participant's voice signal is not input for a predetermined period of time and obtained.

In step S240, whether to activate the cartoon mode may be determined according to some embodiments during the video conference.

According to one embodiment, if there is a keyword related to the conference in the video conference conversation content, or if the similarity exceeds a threshold value by comparing the predetermined conference-related keyword and the video conference conversation content, it may be determined to activate the cartoon mode (S250).

According to one embodiment, when a network problem occurs during a video conference, it may be determined to activate the cartoon mode (S250). Here, the network problem may be, for example, a case when the network environment is disconnected or when voice signals overlap between participants. Here, the method of activating the cartoon mode when a network problem occurs is a method of calculating the network environment index of the video conference and activating the cartoon mode when the network environment index exceeds a predetermined network environment index threshold value.

According to one embodiment, when the similarity between the participant information of the past video conference and the participants of the current video conference exceeds a threshold value, it may be determined to activate the cartoon mode (S250).

According to one embodiment, when the total participation index of the participants exceeds a predetermined threshold value, it may be determined to activate the cartoon mode (S250). Here, the participation index may be, for example, a value obtained by calculating the number of interactions with the video conference GUI of participants in a video conference and summing it up, or a value obtained by calculating the voice signal input data of each participant and summing it up.

According to one embodiment, the embodiments of determining whether to activate the cartoon mode while a video conference is in progress may be determined simultaneously or sequentially, or may be determined by applying a weight to each embodiment. Here, the weight value can be determined according to the characteristics of the industry or company conducting the video conference.

For example, whether to activate the cartoon mode may be determined by calculating the final similarity and activating the cartoon mode if the final similarity exceeds a threshold value.

Here, the final similarity may be calculated by adding one or more values of the similarity of the video conference conversation and the predetermined conference-related keywords multiplied by the first weight, the participation index of the participants in the video conference multiplied by the second weight, and the video conference network environment index multiplied by the third weight and the similarity determined by comparing participants in the video conference and participant information in past video conferences multiplied by the forth weight.

Here, the first to fourth weights may be weights determined by calculating the importance of the criteria for determining whether to activate each cartoon mode.

According to one embodiment, when determining the final similarity, the increase rate value calculated by measuring the reference values for determining whether to activate each cartoon mode at each reference time may be calculated and used.

For example, the final similarity may be calculated by adding one or more values of the increase rate of the similarity of the video conference conversation and the predetermined conference related keywords multiplied by the first weight, the increase rate of the participation index of the participants in the video conference multiplied by the second weight, the increase rate of the video conference network environment index multiplied by the third weight and the increase rate of the similarity determined by comparing participants in the video conference and participant information in past video conferences multiplied by the forth weight.

According to the above-described embodiments, in relation to a video conference, if there is a situation, in which conference is in progress and two or more people are actively having a conversation and there is a problem with the voice of the conversation, it may be determined to activate the cartoon mode. Therefore, by automatically executing the cartoon mode, participants can easily understand the conversation flow. Furthermore, by determining whether to activate the cartoon mode by applying a weight using a plurality of characteristic information related to the video conference, even if the index or similarity calculated in each embodiment of determining the activation of the cartoon mode does not exceed the threshold value, the values calculated in in each embodiment of determining the activation of the cartoon mode are added by calculating the weight to determine whether to activate the cartoon mode based on the final similarity. Thus, if the speech bubble function according to the cartoon mode activation is substantially required, the cartoon mode is automatically executed, and video conference participants can easily understand the content and flow of the conversation.

Specific methods of some embodiments of determining whether to activate the cartoon mode will be described again with reference to FIGS. 4 to 6.

Figure 4:
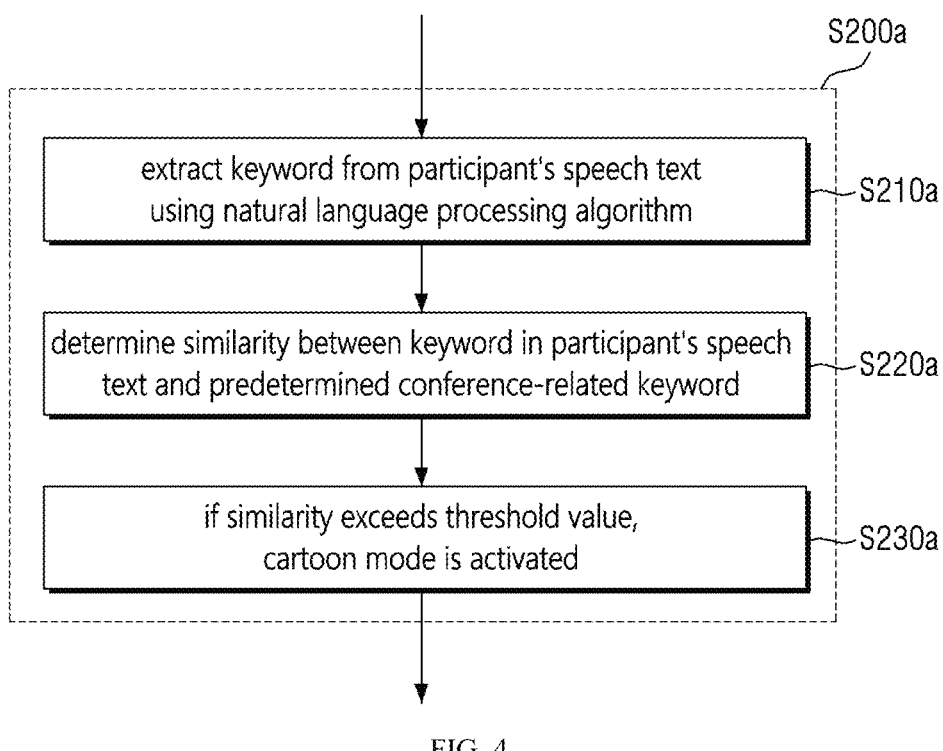

Referring to FIG. 4, as an example of determining whether to activate the cartoon mode, a method of determining whether to activate the cartoon mode by extracting keywords from the conversation content of a video conference is presented (S200a).

First, in step S210a, keywords can be extracted from the first speech text in which the voice signal of the first conference participant is converted into text using a natural language processing algorithm.

Here, the natural language processing algorithm may be a variety of previously known Natural Language Processing (NLP) algorithms.

In step S220a, the similarity between the keyword of the first speech text of the first conference participant and a predetermined conference-related keyword may be determined. Here, various previously known similarity determination algorithms can be used as the algorithm for determining the similarity between keywords.

Here, the predetermined conference-related keywords may be keywords extracted by an AI data collection and processing platform that can collect and process video conference information that has ended in the past into data.

In step S230a, when the similarity between the predetermined conference-related keyword and the keyword of the first speech text exceeds the threshold value, the cartoon mode may be activated.

According to one embodiment, the threshold value of similarity between keywords may be a threshold value of an increase rate calculated by measuring the increase rate of similarity between predetermined conference-related keywords and keywords of the first speech text according to a reference time.

Figure 5:
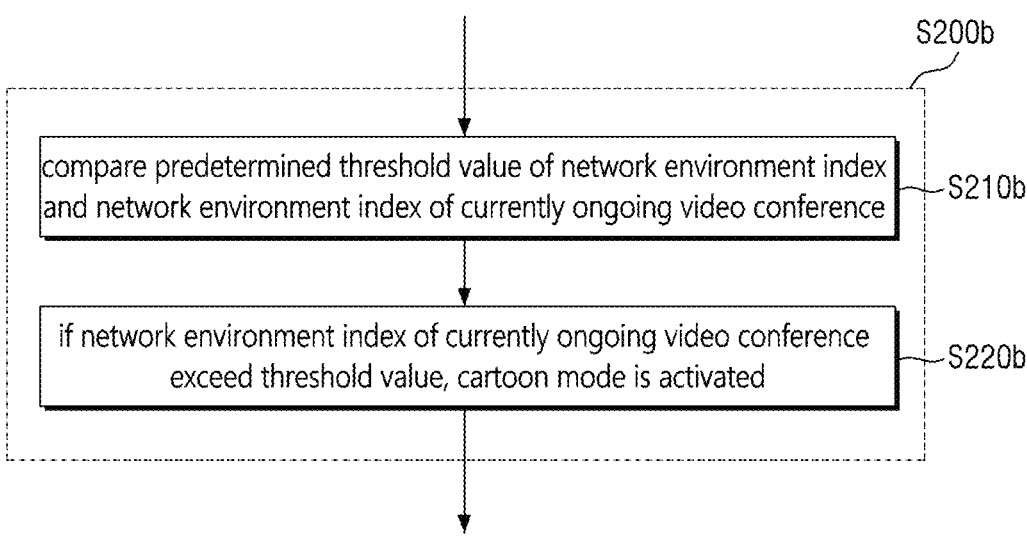

Referring to FIG. 5, as an example of determining whether to activate the cartoon mode, a method of determining whether to activate the cartoon mode based on network environment information of a video conference is presented (S200b).

First, in step S210b, the threshold value of the predetermined network environment index and the network environment index of the video conference may be compared.

Here, the predetermined network environment index may be extracted by an AI data collection and processing platform that can collect and process information from video conferences that have ended in the past into data. For example, the network environment index may be the number of network environment interruptions or voice overlapping phenomenon extracted using the AI data collection and processing platform.

The network environment index of a video conference currently in progress may be the number of network environment interruptions or voice overlapping phenomenon extracted using network environment information recorded at each reference time.

In step S220b, if the network environment index of the video conference exceeds the threshold value, the cartoon mode may be activated.

Figure 6:
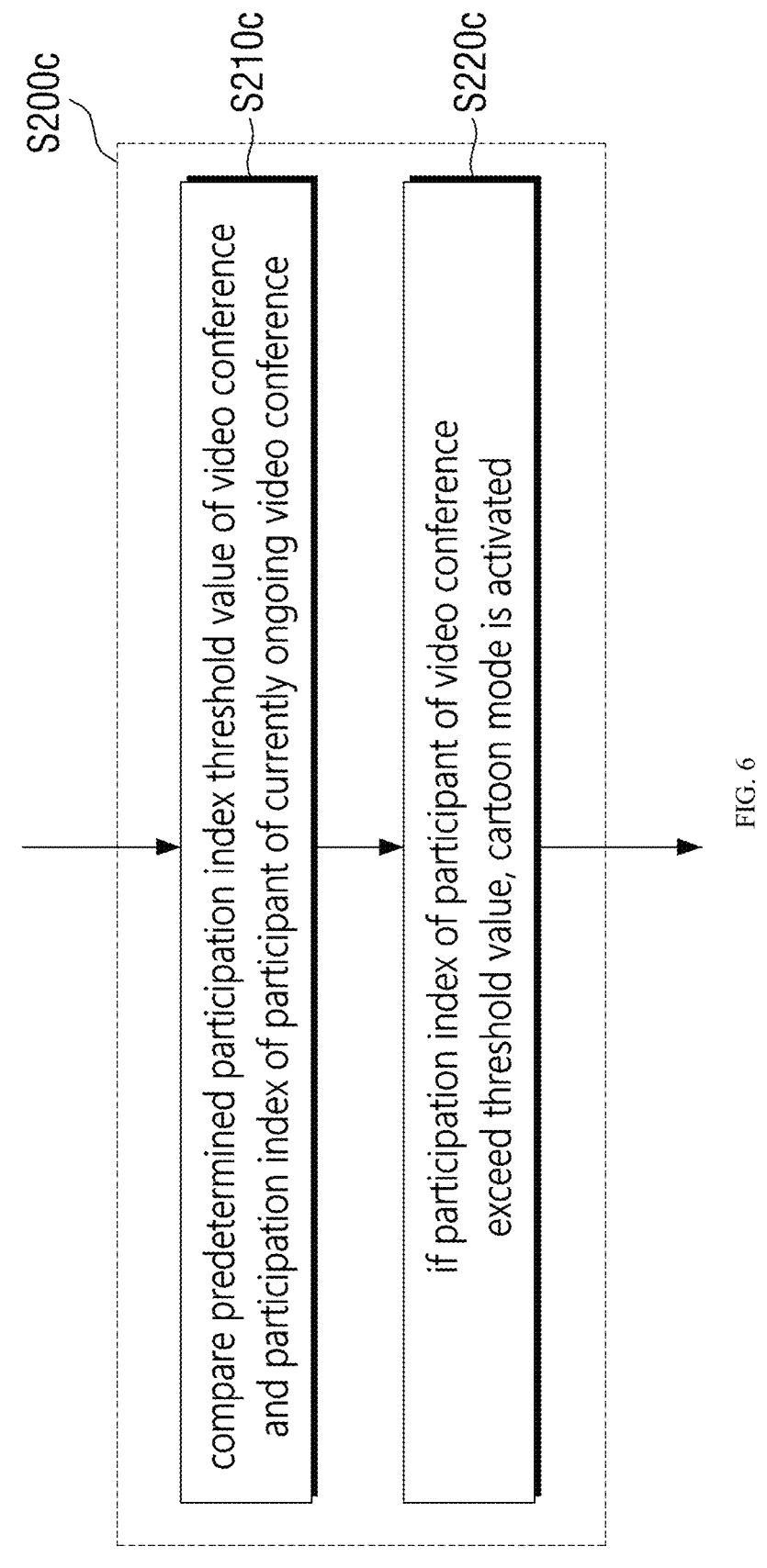

Referring to FIG. 6, as an example of determining whether to activate the cartoon mode, a method of determining whether to activate the cartoon mode based on the participation index of participants in a video conference is presented (S200c).

First, in step S210c, the predetermined threshold value of the participation index of a past video conference and the participation index of the currently ongoing video conference may be compared.

Here, the predetermined participation index of the video conference may be extracted by an AI data collection and processing platform that can collect and process the information of the video conference that ended in the past into data, and the participation index of the currently ongoing video conference may also be extracted by the above AI data collection and processing platform.

Here, the participation index may be, for example, a value obtained by calculating the number of interactions with the video conference GUI of participants in a video conference and summing it up, or a value obtained by calculating the size of each participant's voice signal input data and summing it up. In this case, the predetermined threshold value of the participation index may be the threshold value of the number of interactions or the threshold value of the size of the voice signal input data.

In step S220c, when the total participation index of participants in the video conference exceeds the predetermined threshold value of the participation index of the video conference, the cartoon mode may be activated.

According to the above-described embodiments, by determining whether to activate the cartoon mode using information related to participants, keyword information, or network information related to the video conference, and executing the cartoon mode, participants in the video conference can easily understand the conversation flow.

Referring again to FIG. 2, in step S300, when it is determined to activate the cartoon mode, a video conference screen including a first participant object indicating the first conference participant is provided. Here, the first participant object may include a first speech bubble generated using the first speech text.

Hereinafter, a method of providing a participant object screen including a speech bubble will be described with reference to FIGS. 13 and 14.

Figure 13:
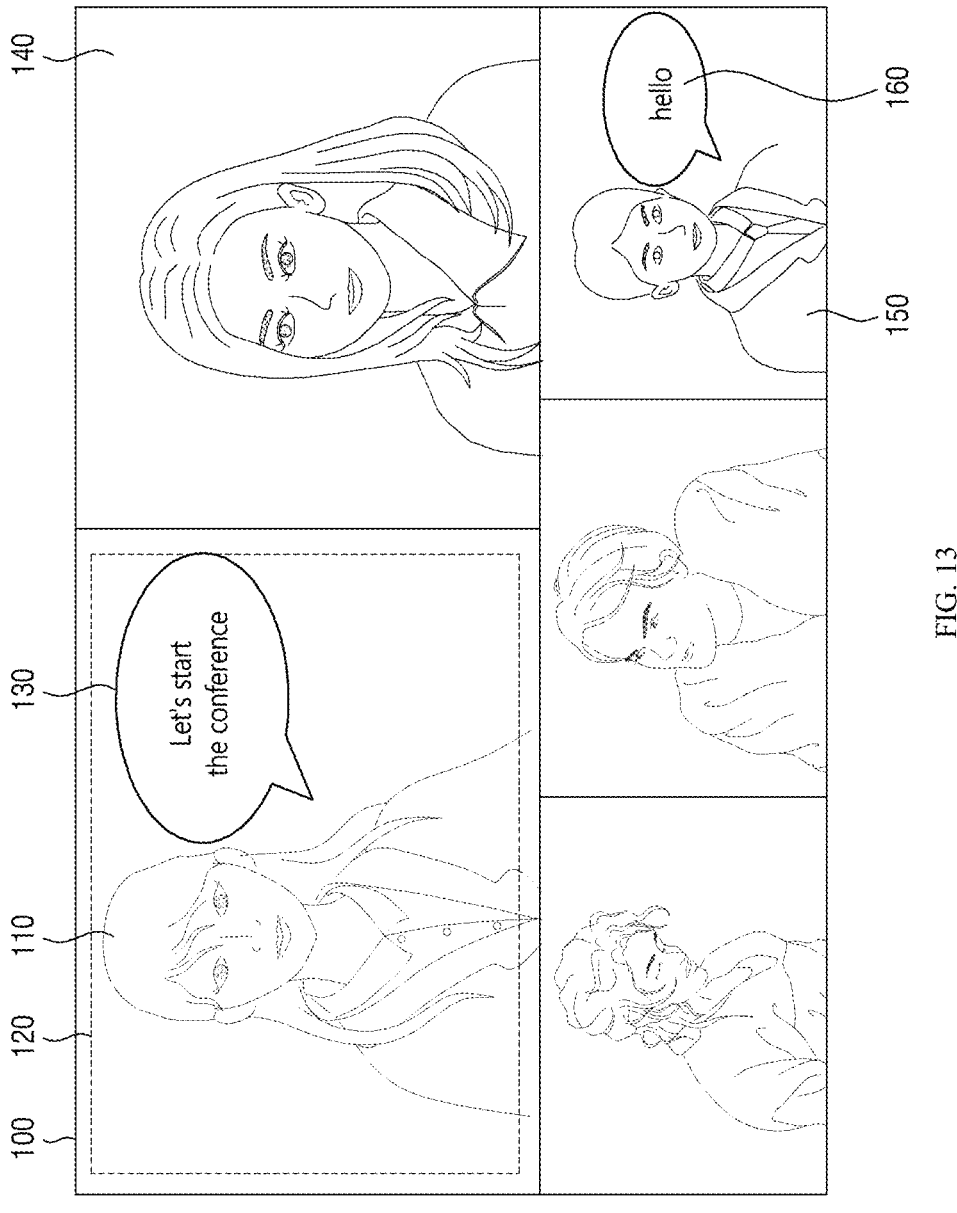
FIGS. 13 and 14 are exemplary diagrams for describing embodiments of the method of providing a participant object screen including a speech bubble described with reference to FIG. 2.

FIG. 13 is an example diagram of a participant object screen of the video conference described in FIG. 2.

The screen illustrated in FIG. 13 may be a screen displayed on the user terminal 10, or may be a screen provided to the user terminal 10 from the relay server 20.

As illustrated in FIG. 13, a video conference screen 100, on which objects corresponding to all participants of the video conference are displayed, may be displayed. The video conference screen 100 may comprise a conference presenter object 110, a conference facilitator object 140, and a first participant object 150. Here, the screen display position and screen size of each participant object, including the conference facilitator object 140, the conference presenter object 110, and the first participant object 150, may change. Here, the number of conference presenters, facilitators, and participants may change, and the conference presenters and conference facilitators may not be included in the video conference depending on the conference method.

According to one embodiment, when a conference presenter speaks, the conference presenter object screen 120 may be displayed to be distinguished from the screens of other participants and facilitators.

According to one embodiment, when the conference presenter makes the first speech, the voice signal of the first speech is converted into the first speech text, and the first speech bubble 130 including the first speech text may be included in the conference presenter object screen 120 and displayed on the user terminal 10.

According to one embodiment, when the video conference method is not a one-way method by the conference presenter and the first participant makes the second speech, the voice signal of the second speech is converted into the second speech text, and the second speech bubble 160 including the second speech text may be included in the screen of the first participant object 150 and displayed on the user terminal 10.

Figure 14:
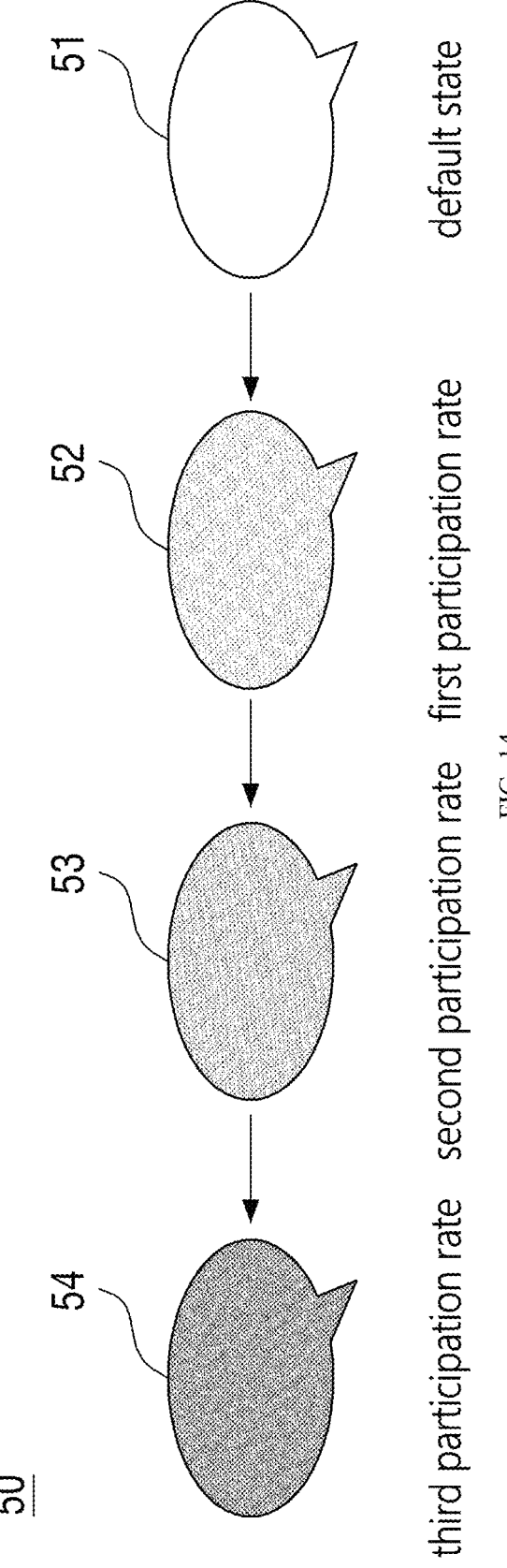

FIG. 14 is an example diagram of a method of providing a video conference speech bubble, in which the second speech bubble 160 included in the screen of the first participant object 150 of FIG. 13 is displayed differently depending on the participation rate of the first participant.

Referring to FIG. 14, an example is shown, in which the background color of a speech bubble generated according to the participant's speech changes depending on the participant's participation level.

First, a case where the first participant's participation level is in the default state (51) is shown, and when the first participant's participation level is higher than or equal to the first participation rate, the color of the speech bubble may be changed to the first color and displayed (52). Speech bubbles for the case where the first participant's participation rate is higher than or equal to the second participation rate (53) and for the case where the first participant's participation rate is higher than or equal to the third participation rate (54) are shown, respectively.

Here, the participation level of the first participant may be predetermined based on the number of speech made by the first participant, and the participation level of the first participant may be previously determined based on the number of times the first participant selects speech bubbles of other participants. An embodiment in which a participant selects a speech bubble will be described later in FIG. 18.

According to one embodiment, in addition to changing the color of the speech bubble, various methods may be applied to display the participant's participation level, such as changing the thickness of the border of the speech bubble according to the participation rate.

Referring back to FIG. 2, a method (S300a) of performing a whisper function as an embodiment of providing a participant object screen including a speech bubble will be described with reference to FIG. 7.

Figure 7:
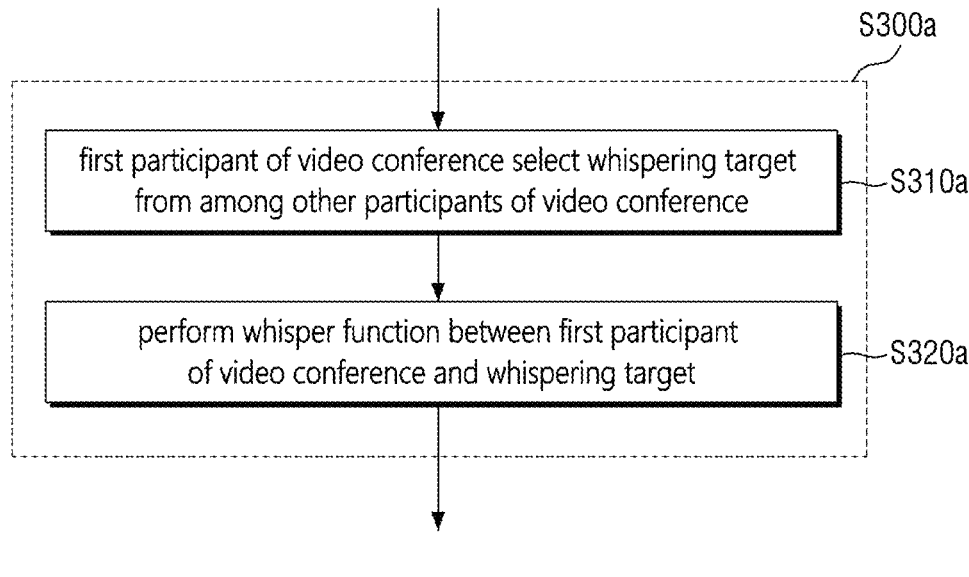
FIG. 7 is a detailed flowchart for describing in detail an embodiment of the method of providing a participant object screen including a speech bubble described with reference to FIG. 2.

Referring to FIG. 7, in step S310a, the user can select a whispering target from among other participants in the video conference.

In step S320a, a whisper function may be performed between the user and the whispering target.

Figure 15:
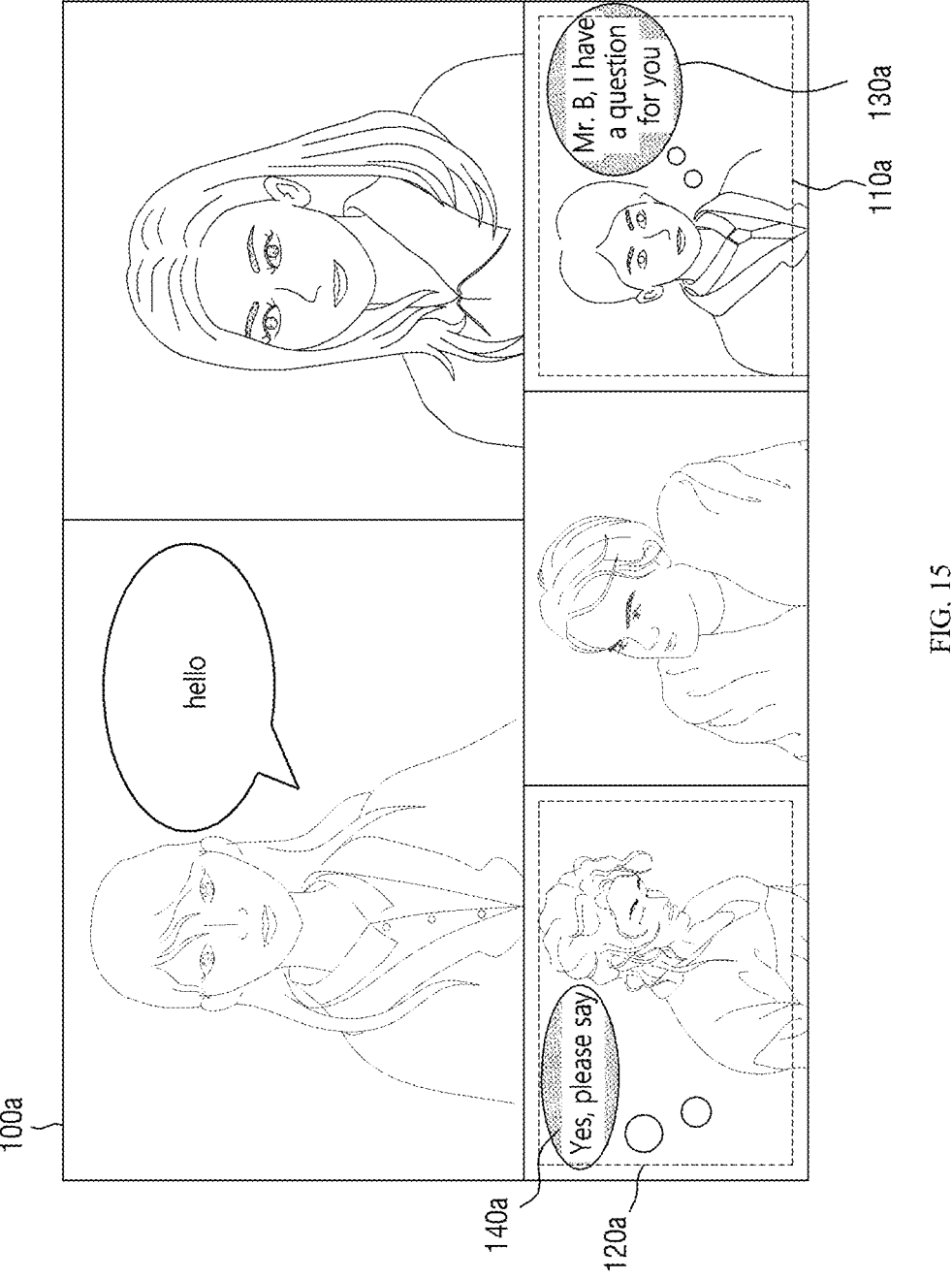
FIG. 15 is an example diagram for describing an embodiment of the method of providing a participant object screen including a speech bubble described in FIG. 7.

FIG. 15 below is a diagram illustrating a situation in which the whisper function between participants is performed.

Referring to FIG. 15, a second participant object screen 110a and a third participant object 120a may be displayed on the video conference screen 100a.

Here, the second participant may designate the third participant as the whispering target and select the whisper function, thereby performing the whisper function.

Here, the whisper function may be a function, in which voice signals are transmitted only between the second participant and the third participant who are the designated whispering target. In addition, the whisper function may comprise a function of displaying the second participant's whisper speech bubble 120a and the third participant's whisper speech bubble 140a, in which the whisper voice signal is converted into text and displayed only on the second participant terminal and the third participant terminal. In other words, other participants cannot recognize the voice signals that the second and third participants communicate with each other through the whisper function, and since the whisper speech bubbles generated through the whisper function between the second and third participants are not displayed in the other participants' terminals, the text included in the whisper speech bubble cannot be recognized.

Figure 8:
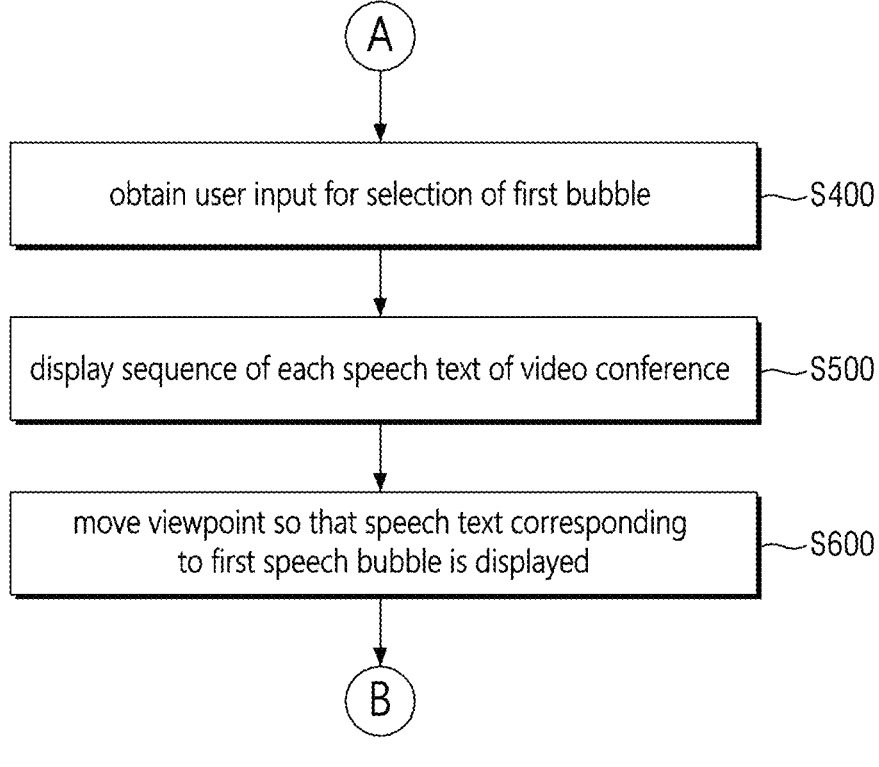
FIGS. 8 and 9 are diagrams for describing a method of displaying a sequence of speech texts according to another embodiment of the present invention.
Figure 9:
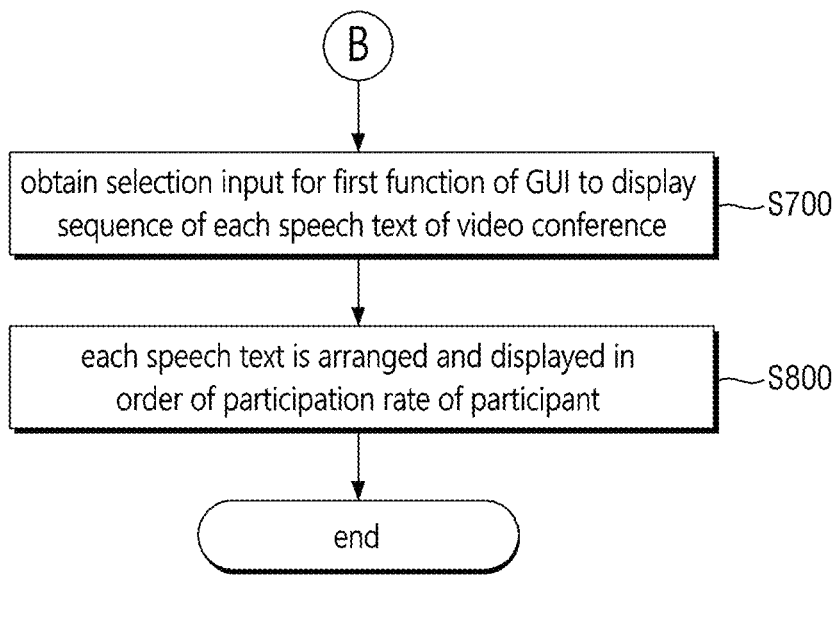

FIGS. 8 and 9 are diagrams for describing a method of displaying a sequence of speech texts according to another embodiment of the present invention.

Referring to FIG. 8, in step S400, a user input indicating selection of the first speech bubble generated using the first speech text may be obtained. Additionally, the user input indicating selection of the first speech bubble may be, for example, a user's click input on the first speech bubble, or a user's touch input on the first speech bubble, and various other known selection methods may be applied.

In step S500, in response to the user's input, a sequence of each speech text of the video conference may be displayed. That is, the speech bubble history function described above can be performed.

According to one embodiment, the sequence of each speech text of the video conference may be the speech text of each participant divided by participant and displayed in chronological order.

In step S600, the viewpoint may be automatically moved so that the speech text corresponding to the first speech bubble is displayed.

According to the above-described embodiments, when the user misses the flow of conversation due to the user's network problem or voice overlapping problem, when the user selects a speech bubble, the speech bubble history function is performed, and the viewpoint is automatically moved so that the speech text corresponding to the speech bubble selected by the user is displayed. Therefore, the user can easily understand the flow of the conversation by checking speech texts above and below the speech text corresponding to the selected speech bubble.

Hereinafter, with reference to FIG. 16, a method of performing the speech bubble history function according to an exemplary user's selection of a speech bubble will be described.

Figure 16:
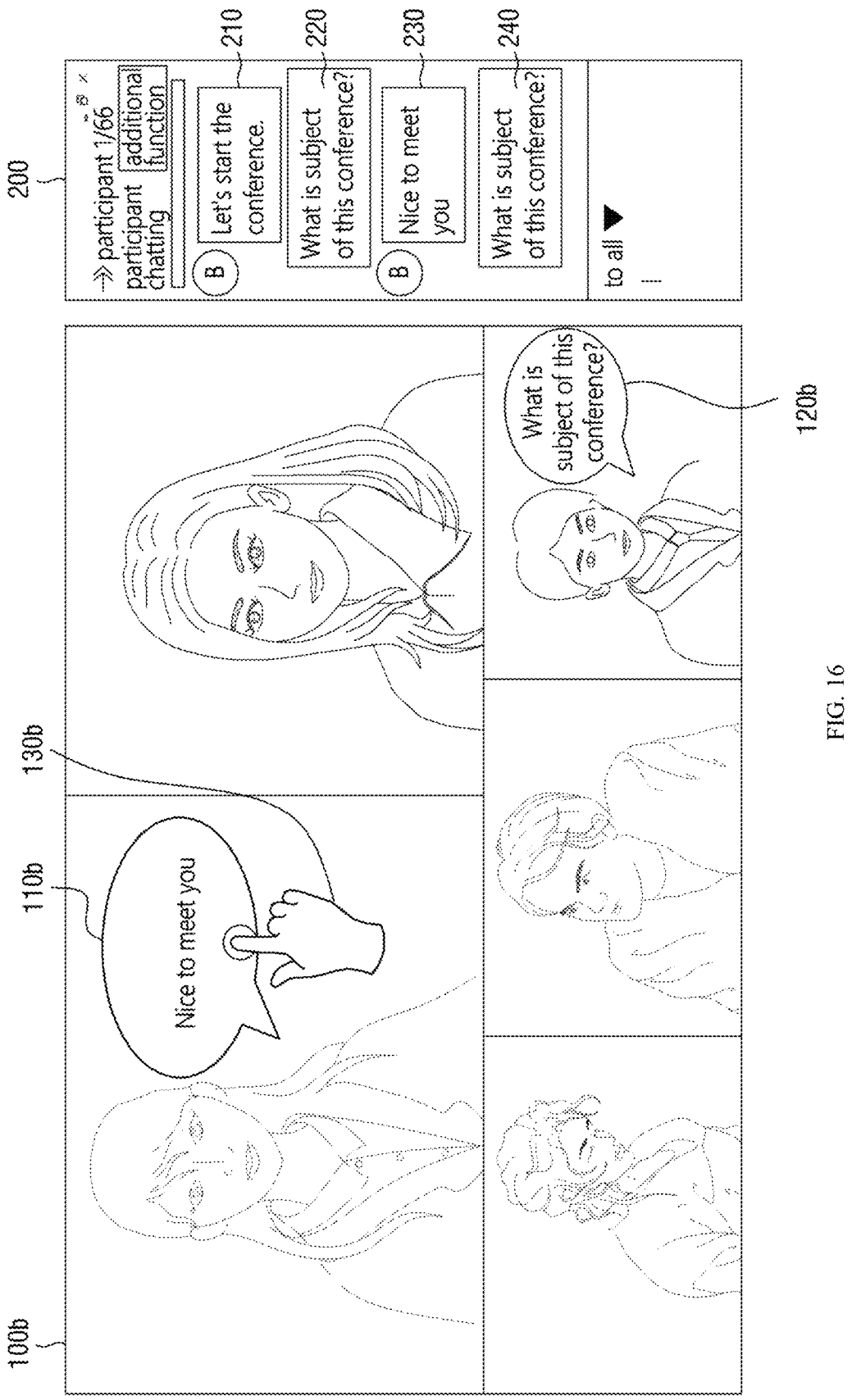
FIGS. 16 and 17 are exemplary diagrams for describing a method of displaying the sequence of speech texts described in FIGS. 8 and 9.

Referring to FIG. 16, a video conference screen 10 is shown, and a first presenter speech bubble 110b generated using the speech text of the presenter may be displayed, and a fourth participant speech bubble 120b generated using the speech text of the fourth participant may be displayed.

When the user selects the first presenter speech bubble 110b (130b), the first speech bubble history 200 may be generated.

The generated speech bubble history 200 may be a GUI function, in which the speech text corresponding to the first presenter speech bubble 110b is automatically displayed by moving the viewpoint so that the first presenter speech bubble 110b selected by the user enters into the user's viewpoint.

For example, when the user selects the first presenter speech bubble 110b, the speech text 230 corresponding to the first presenter speech bubble 110b may be displayed by automatically moving the viewpoint, and the user may check the previous speech text 210 and 220 and the subsequent speech text 240.

Hereinafter, with reference to FIG. 9, how the user uses the additional function of the speech bubble history when the speech bubble history is displayed will be described.

Referring to FIG. 9, in step S700, an input for the user to select a collection function of the displayed speech bubble history may be obtained.

In step S800, when the collection function is selected, each speech text may be arranged and displayed in order of participation rate of participants in the video conference.

Here, the participation rate of participants may be, for example, a value obtained by calculating the number of interactions with the video conference GUI during the video conference participant's reference time or a value obtained by calculating the participant's voice signal input data during the reference time. In addition, various known methods can be used to calculate the participation rate of participants in a video conference.

Hereinafter, with reference to FIG. 17, an example, in which the collection function of the speech bubble history described in FIG. 9 is performed, will be described.

Figure 17:
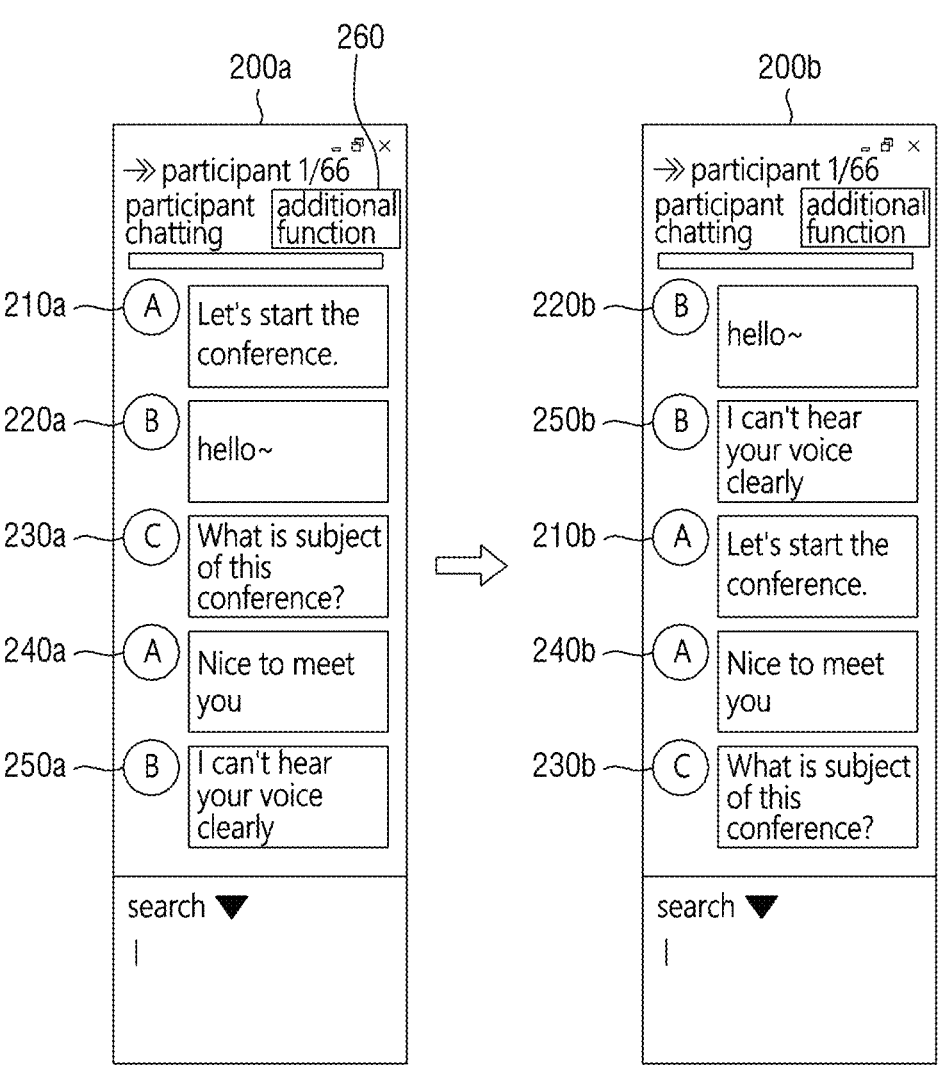

Referring to FIG. 17, the speech bubble history 200a before performing the additional function 260 is shown. Here, the sequence of speech texts included in the speech bubble history may be listed in the chronical order in which the speech texts were generated (210a to 250a). Here, the additional function 260 may be the collection function described above.

When the user selects the additional function 260, the speech texts may be rearranged in order of the participation rate of the participant corresponding to each speech text and displayed in the speech bubble history 200*b*.

For example, for participants A, B, and C, if the participation rate is high in the order of participants B, A, and C, as the user selects the additional function 260, the speech texts of participant B with the highest participation rate 220*a*, 250*a* can be moved to the first (220*b*) and second (250*b*) speech text positions, respectively, and the speech texts (210*a*, 240*a*) of participant A with the second highest participation rate can be moved to the third (210*b*) and fourth (240*b*) speech text positions, respectively, and the speech text 230*a* of participant C with the lowest participation rate can be moved to the fifth speech text position (230*b*).

According to the above-described embodiments, when the user selects the collection function, the speech texts included in the speech bubble history are rearranged in the order of the participation rate of the participants corresponding to each speech text, so that the user can check the speech text sequence in the order of the participant's participation rate, and accordingly, can identify the participation rate of the participant, and can collect and check the speech texts of participants with a specific participation rate among participants.

Figure 10:
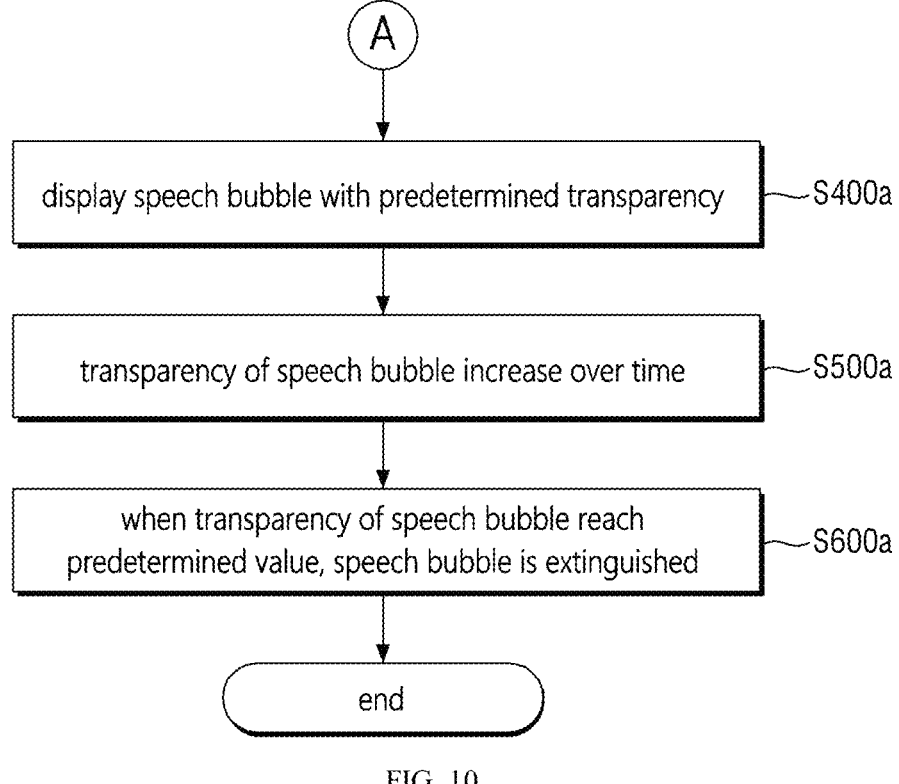
FIGS. 10 and 11 are flowcharts of a method for extinguishing a speech bubble according to another embodiment of the present disclosure.
Figure 11:
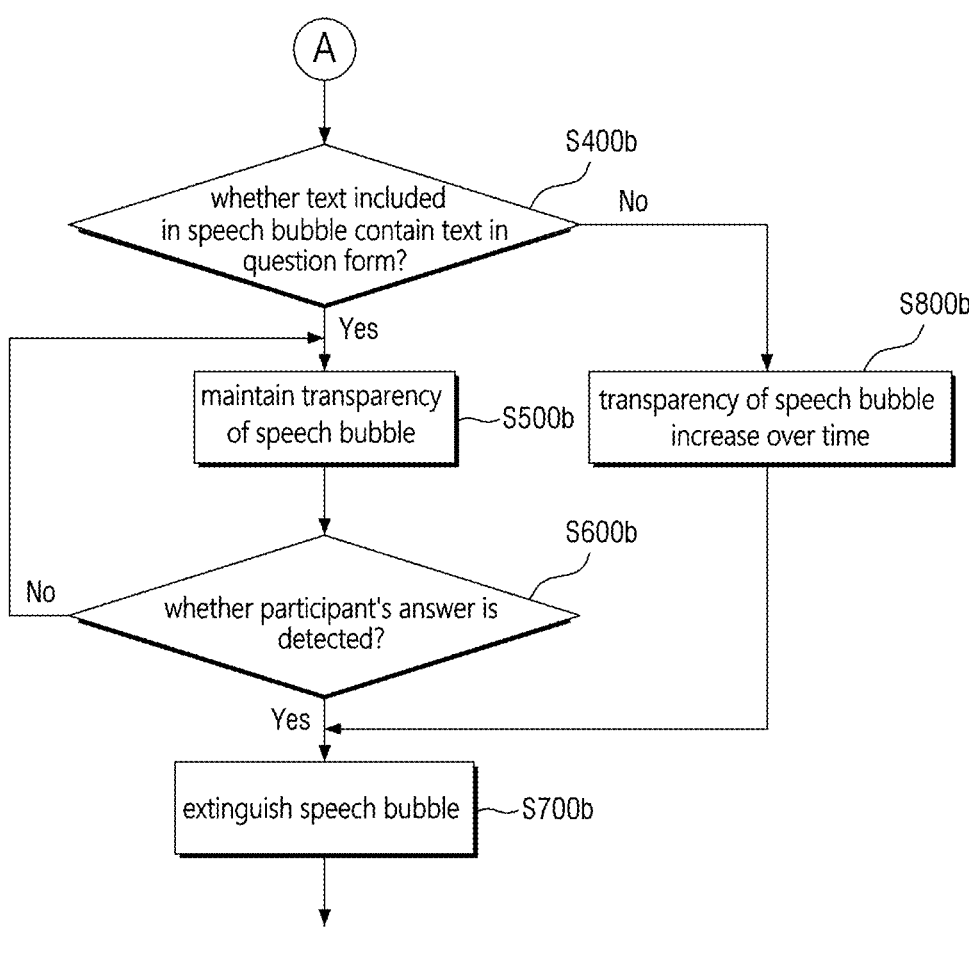

FIGS. 10 and 11 are flowcharts of a method for extinguishing a video conference speech bubble according to another embodiment of the present disclosure.

Referring to FIG. 10, when the cartoon mode is activated and a participant object screen including a speech bubble generated using speech text is provided, the speech bubble may be displayed with predetermined transparency in step S400*a*.

In step S500*a*, the transparency of the speech bubble may increase over time.

In step S600*a*, when the transparency of the speech bubble reaches a predetermined value, the speech bubble may be extinguished.

For example, when a speech bubble is first generated, it appears dark, but gradually becomes lighter over time, and when the transparency reaches a predetermined value, the speech bubble may be extinguished.

Referring to FIG. 11, when a participant object screen including a speech bubble generated using speech text is provided, it may be determined in step S400*b* whether the text included in the speech bubble includes text in a question format.

According to one embodiment, whether the text generated inside the speech bubble includes text in a question format can be determined only if the speech bubble is a speech bubble included in the presenter object, and if the speech bubble is a speech bubble included in the participant object, it may not be determined whether the text generated inside the speech bubble includes text in a question format.

According to one embodiment, as to whether the text included in the speech bubble includes text in a question format, when the text contains keywords identical to predetermined question-related keywords, or when the similarity between question-related keywords extracted from the text and predetermined question-related keywords is greater than or equal to a threshold value, it may be determined that the speech bubble contains text in a question format. Here, various known algorithms can be used to determine the similarity of keywords.

If it is determined that the speech bubble contains text in a question format, the transparency of the speech bubble may be maintained in step S500*b*.

According to one embodiment, maintaining the transparency of the speech bubble may mean that the transparency of the speech bubble is maintained rather than increasing over time, so that the speech bubble is displayed while maintaining transparency without disappearing.

In step S600*b*, when a video conference participant's answer to the question-format text generated inside the speech bubble is detected, the speech bubble may be extinguished (S700*b*).

According to one embodiment, when more than half of the participants in the video conference speak, it may be determined that the answer of the participant in the video conference has been detected.

According to one embodiment, when a participant in a video conference makes a speech containing a predetermined answer-related keyword, it may be determined that the participant's answer has been detected.

Again in step S400*b*, if the text generated inside the speech bubble does not include text in a question format, the transparency of the speech bubble may increase with the passage of time (S800*b*). In this case, as shown in FIG. 10, when the transparency of the speech bubble reaches a predetermined value, the speech bubble may be extinguished (S700*b*).

In the above-described embodiments, when the speech bubble contains text in a question format, the speech bubble does not automatically disappear, so that the participants do not miss the questioner's question, thereby encouraging the participants to answer.

Figure 12:
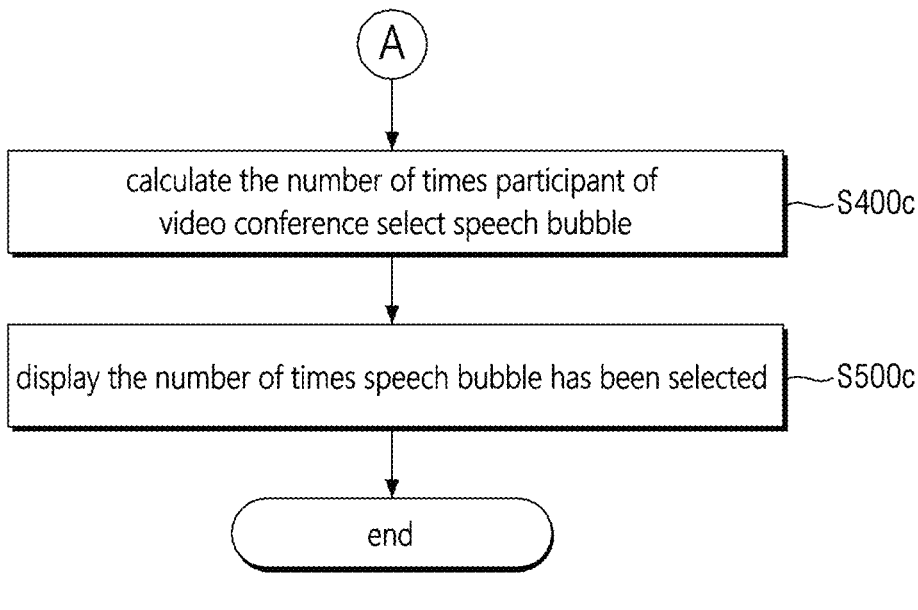
FIG. 12 is a flowchart of a method for displaying a level of attention to a speech bubble according to another embodiment of the present disclosure.

FIG. 12 is a flowchart of a method for displaying a level of attention to a speech bubble in a video conference according to another embodiment of the present disclosure.

Referring to FIG. 12, in step S400*c*, the number of times video conference participants select the first speech bubble can be calculated.

In step S500*c*, the number of times the first speech bubble is selected may be displayed as being included in the participant object including the first speech bubble.

Hereinafter, the above method of displaying the level of attention will be described with reference to FIG. 18, which illustrates the method of displaying the level of attention for a speech bubble in a video conference as an example.

Figure 18:
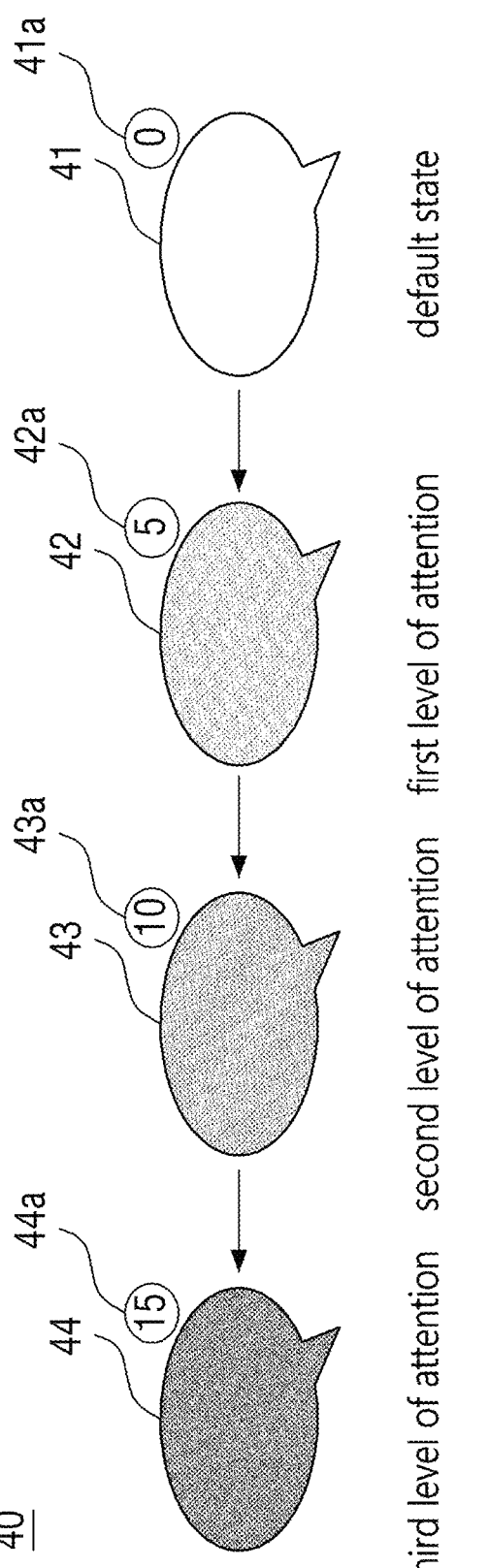
FIG. 18 is an example diagram illustrating a method of displaying an attention level to a speech bubble described in FIG. 12.

Referring to FIG. 18, an example of a series of changes 40 in the display state of a speech bubble according to the level of attention is shown.

First, in the case of a speech bubble 41 in the default state without the level of attention, if another participant does not select the speech bubble 41 in the default state, the number of times may be displayed as 0 (41*a*). If other participants select the speech bubble more than or equal to 5 times but less than 10 times, the speech bubble 42 of the first level of attention is displayed, and the number of selections may be displayed 42*a*. Additionally, when other participants select the speech bubble more than or equal to 10 times but less than 15 times, a speech bubble 43 of the second level of attention is displayed, and the number of selections may be displayed (43*a*). If other participants select the speech bubble more than or equal to 15 times, the speech bubble 44 of the third level of attention is displayed, and the number of selections may be displayed (44*a*). Here, as the speech bubble changes from the default state 41 to the third level of attention state 44, the color of the speech bubble may become darker.

According to the above-described embodiments, by displaying the level of attention of a speech bubble, participants in a video conference can visually check the importance of the speech text included in the speech bubble, making it possible to easily check important keywords and important matters discussed in the conference.

Figure 19:
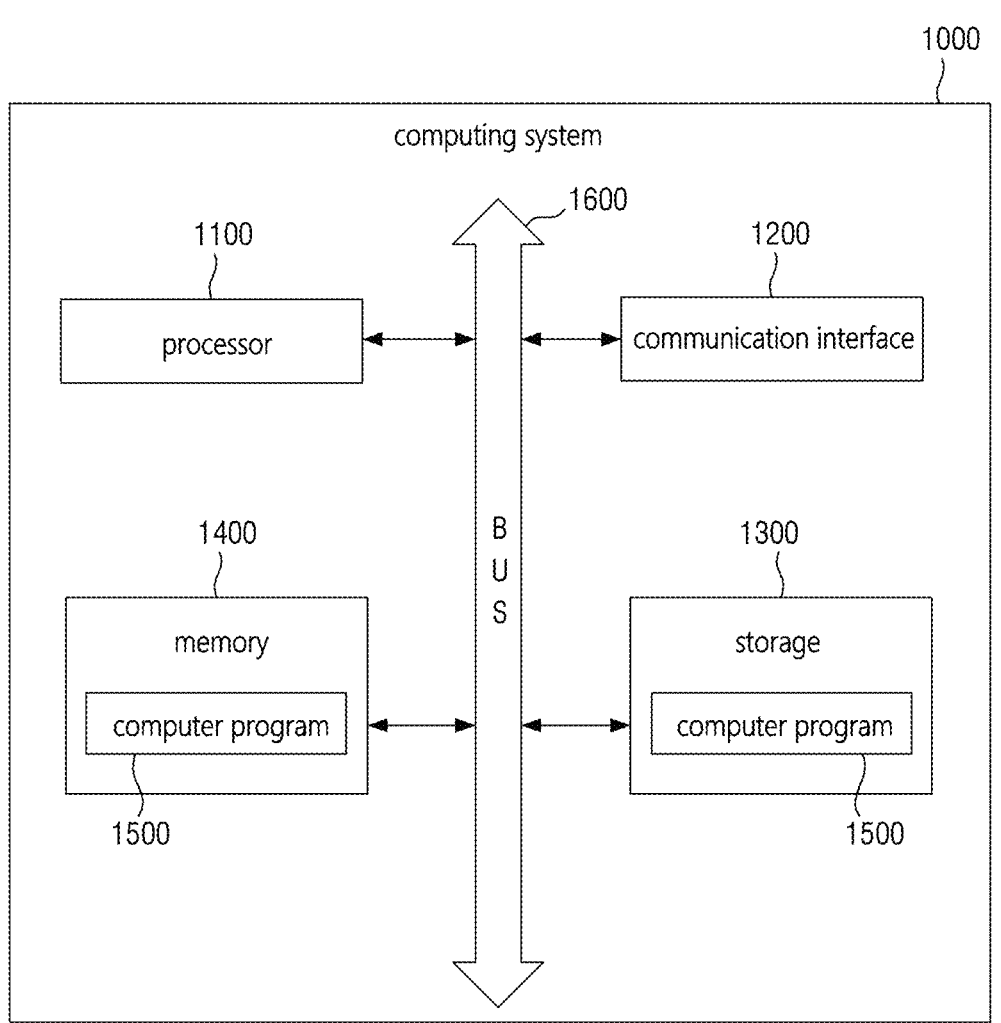
FIG. 19 is a hardware configuration diagram of a computing system according to some embodiments of the present disclosure.

FIG. 19 is a hardware configuration diagram of a computing system according to some embodiments of the present disclosure. The computing system 1000 shown in FIG. 19 may refer to, for example, a computing system including the relay server 20 described with reference to FIG. 1 and may refer to a computing system including the user terminal 10. The computing system 1000 may comprise one or more processors 1100, a system bus 1600, a communication interface 1200, a memory 1400 that loads a computer program 1500 executed by the processor 1100, and a storage 1300 that stores a computer program 1500.

The processor 1100 controls the overall operation of each component of the computing system 1000. The processor 1100 may perform operations on at least one application or program to execute methods/operations according to various embodiments of the present disclosure. The memory 1400 stores various data, commands and/or information. The memory 1400 may load one or more computer programs 1500 from the storage 1300 to execute methods/operations according to various embodiments of the present disclosure. The bus 1600 provides communication functions between components of computing device 1000. The communication interface 1200 supports internet communication of the computing system 1000. The storage 1300 may non-temporarily store one or more computer programs 1500. The computer program 1500 may include one or more instructions implementing methods/operations according to various embodiments of the present disclosure. When the computer program 1500 is loaded into the memory 1400, the processor 1100 can perform methods/operations according to various embodiments of the present disclosure by executing the one or more instructions.

In some embodiments, the computer program 1500 may perform operations comprising receiving a first speech text converted from a voice signal of a first conference participant participating in the video conference into text, determining whether to activate a cartoon mode, displaying, when activation of the cartoon mode is determined, a conference screen including a first participant object indicating the first conference participant, wherein the first participant object includes a first speech bubble generated using the first speech text; and displaying, in response to a user input from a user of the computing system indicating a selection of the first speech bubble, a sequence of each speech text of the video conference, and automatically adjusting a viewpoint so that a speech text corresponding to the first speech bubble is displayed.

So far, various embodiments of the present disclosure and effects according to the embodiments have been described with reference to FIGS. 1 to 19. Effects according to the technical spirit of the present disclosure are not limited to the effects mentioned above, and other effects not mentioned will be clearly understood by those skilled in the art from the description below.

The technical idea of the present disclosure described so far may be implemented as computer readable code on a computer readable medium. The computer program recorded on the computer-readable recording medium may be transmitted to another computing device through a network such as the Internet, installed in the other computing device, and thus used in the other computing device.

Although operations are shown in a particular order in the drawings, it should not be understood that the operations should be performed in the specific order shown or in a sequential order, or that all shown operations should be performed to obtain a desired result. In certain circumstances, multitasking and parallel processing may be advantageous. Although the embodiments of the present disclosure have been described with reference to the accompanying drawings, those of ordinary skill in the art to which the present disclosure pertains can understand that the present invention can be practiced in other specific forms without changing the technical spirit or essential features. Therefore, it should be understood that the embodiments described above are illustrative in all respects and not limiting. The protection scope of the present invention should be construed by the claims below, and all technical ideas within the equivalent range should be construed as being included in the scope of the technical ideas defined by the present disclosure.

What is claimed is:

1. A method for providing a speech bubble in a video conference, the method being performed by a user terminal and comprising:

receiving a first speech text converted from a voice signal of a first conference participant participating in a video conference into a text;

determining whether to activate a cartoon mode;

displaying, based on determining to activate the cartoon mode, a conference screen including a first participant object and a first speech bubble, wherein the first participant object indicates the first conference participant and the first speech bubble is generated using the first speech text;

displaying, in response to a user input to select the first speech bubble, a sequence of speech texts of the video conference, the sequence including a speech text corresponding to the first speech bubble;

detecting whether the first speech text includes a text in a question format;

maintaining a transparency of the first speech bubble based on detecting that the first speech text includes the text in the question format; and terminating the first speech bubble based on detecting a response from a participant of the video conference to the text in the question format.

2. The method of claim 1, further comprising:

arranging and displaying, based on a user input to select a first function of a graphical user interface (GUI) that displays the sequence of the speech texts of the video conference, the speech texts in an order of a participation rate of participants of the video conference.

3. The method of claim 1, wherein the determining whether to activate the cartoon mode comprises:

determining a similarity between participants of the video conference and participants of a past video conference, and determining to activate the cartoon mode based on the similarity exceeding a threshold value.

4. The method of claim 1, wherein the determining whether to activate the cartoon mode comprises:

extracting a keyword from the first speech text using a natural language processing algorithm; and determining, based on a similarity between the keyword and a predetermined keyword exceeding a threshold value, to activate the cartoon mode.

5. The method of claim 1, wherein the determining whether to activate the cartoon mode comprises:

comparing a predetermined participation index threshold value with a participation index of participants of the video conference, and determining to activate the cartoon mode based on the participation index of the participants of the video conference exceeding the predetermined participation index threshold value.

6. The method of claim 1, wherein the determining whether to activate the cartoon mode comprises:

determining, based on a network environment index of the video conference exceeding a predetermined threshold value of a network environment index, to activate the cartoon mode.

7. The method of claim 1, wherein the displaying the conference screen comprises:

displaying the first speech bubble having a predetermined transparency;

gradually increasing the transparency of the first speech bubble over time; and terminating the first speech bubble based on the transparency reaching a predetermined value.

8. The method of claim 1, wherein the displaying the conference screen comprises:

determining a level of attention of participants of the video conference with respect to the first speech bubble, and displaying the first speech bubble by reflecting the level of attention.

9. The method of claim 8, wherein the displaying the first speech bubble by reflecting the level of attention comprises:

determining a number of times the participants of the video conference select the first speech bubble; and displaying the number of times the first speech bubble is selected.

10. The method of claim 1, further comprising:

selecting, by a user of the user terminal, a whispering target that includes at least one of participants of the video conference; and performing a whisper function between the user and the whispering target.

11. A method for providing a speech bubble in a video conference, the method being performed by a user terminal and comprising:

receiving a first speech text converted from a voice signal of a first conference participant participating in a video conference into a text;

determining whether to activate a cartoon mode;

displaying, based on determining to activate the cartoon mode, a conference screen including a first participant object and a first speech bubble, wherein the first participant object indicates the first conference participant and the first speech bubble is generated using the first speech text;

detecting whether the first speech text includes a text in a question format;

maintaining a transparency of the first speech bubble based on detecting that the first speech text includes the text in the question format; and terminating the first speech bubble based on detecting a response from a participant of the video conference to the text in the question format, wherein the first speech bubble is rendered to visually express predetermined information related to the first conference participant.

12. The method of claim 11, wherein the determining to activate the cartoon mode comprises:

determining a similarity between participants of the video conference and participants of a past video conference, and determining to activate the cartoon mode based on the similarity exceeding a threshold value.

13. The method of claim 11, wherein the determining to activate the cartoon mode comprises:

extracting a keyword from the first speech text using a natural language processing algorithm; and determining, based on a similarity between the keyword and a predetermined keyword exceeding a threshold value, to activate the cartoon mode.

14. The method of claim 11, wherein the predetermined information is information indicating a level of attention of participants of the video conference with respect to the first speech bubble.

15. The method of claim 14, wherein the level of attention of the participants of the video conference is a value determined based on a number of times the participants of the video conference select the first speech bubble.

16. The method of claim 11, wherein the predetermined information is information indicating a participation level of the first conference participant, wherein the participation level is a value determined based on a number of speeches of the first conference participant.

17. A method for providing a speech bubble in a video conference, the method being performed by a user terminal and comprising:

receiving a first speech text converted from a voice signal of a first conference participant participating in a video conference into a text;

determining whether to activate a cartoon mode;

displaying, based on determining to activate the cartoon mode, a conference screen including a first participant object and a first speech bubble, wherein the first participant object indicates the first conference participant and the first speech bubble is generated using the first speech text; and in response to a speech bubble removal signal received according to an occurrence of an event for removing the first speech bubble, removing the first speech bubble from the conference screen, wherein the first speech text includes a text in a question format, and the event for removing the first speech bubble is an event, in which a response of a participant of the video conference to the text in the question format is detected.

18. The method of claim 17, wherein the determining to activate the cartoon mode comprises:

determining a similarity between participants of the video conference and participants of a past video conference, and determining to activate the cartoon mode based on the similarity exceeding a threshold value.

* * * * *